United States Patent [19]

Cziptschirsch et al.

[11] Patent Number: 5,018,800

[45] Date of Patent: May 28, 1991

[54] ASHTRAY FOR VEHICLES

[75] Inventors: Kurt Cziptschirsch; Volker Dabringhaus; Peter Wegel, all of Wuppertal, Fed. Rep. of Germany

[73] Assignee: Gebr. Happich GmbH, Fed. Rep. of Germany

[21] Appl. No.: 357,425

[22] Filed: May 25, 1989

[30] Foreign Application Priority Data

Aug. 2, 1988 [DE] Fed. Rep. of Germany ....... 3826180

[51] Int. Cl.$^5$ .............................................. A47B 88/04
[52] U.S. Cl. ............................... 312/344.1; 296/37.9; 384/20; 384/23
[58] Field of Search ................... 312/246, 330.1, 344.1, 312/346, 347; 296/37.9; 384/20, 23

[56] References Cited

U.S. PATENT DOCUMENTS

| 2,793,092 | 5/1957 | Peterson | 312/246 |
| 3,321,253 | 5/1967 | Everburg | 384/23 |
| 3,351,404 | 11/1967 | Blake | 312/246 |
| 3,460,876 | 8/1969 | Boer | 312/246 |
| 3,466,107 | 9/1969 | Blake | 312/246 |
| 3,489,478 | 1/1970 | Beurkens | 312/246 |
| 3,521,938 | 7/1970 | Emaus | 312/246 |
| 3,586,394 | 6/1971 | Hecksel | 384/23 |
| 3,600,051 | 8/1971 | De Boer | 312/246 |
| 3,601,464 | 8/1971 | De Boer | 312/246 |
| 3,738,725 | 6/1973 | Visser | 312/246 |
| 4,266,836 | 5/1981 | Sato | 312/246 |

FOREIGN PATENT DOCUMENTS

| 1696308 | 3/1955 | Fed. Rep. of Germany . |
| 1737300 | 10/1955 | Fed. Rep. of Germany . |
| 1742307 | 3/1957 | Fed. Rep. of Germany . |
| 1759721 | 1/1958 | Fed. Rep. of Germany . |
| 1765298 | 4/1958 | Fed. Rep. of Germany . |
| 1794589 | 5/1959 | Fed. Rep. of Germany . |
| 1814636 | 5/1960 | Fed. Rep. of Germany . |
| 1812879 | 6/1960 | Fed. Rep. of Germany . |
| 1832239 | 5/1961 | Fed. Rep. of Germany . |
| 1113108 | 8/1961 | Fed. Rep. of Germany . |
| 1143726 | 2/1963 | Fed. Rep. of Germany . |
| 1225433 | 9/1966 | Fed. Rep. of Germany . |
| 1977221 | 1/1968 | Fed. Rep. of Germany . |
| 2157661 | 5/1973 | Fed. Rep. of Germany . |
| 2731984 | 2/1979 | Fed. Rep. of Germany . |
| 3208788A1 | 9/1983 | Fed. Rep. of Germany . |
| 3409732 | 9/1985 | Fed. Rep. of Germany . |

Primary Examiner—Kenneth J. Dorner
Assistant Examiner—Brian K. Green
Attorney, Agent, or Firm—Ostrolenk, Faber, Gerb & Soffen

[57] ABSTRACT

A container, like an ashtray, particularly for use in a vehicle. A housing with an open side and a drawer like insert slidably guided for movement into and out of the housing. A plurality of guide members fastened to each of the opposite sidewalls of the housing past which the insert is moved. Each guide member includes a plate at the housing sidewall and outward projections on the plate, which are received in a respective guide groove defined on the respective opposite sidewall of the insert. Each projection includes a forwardly bent portion and a curved fillet connection to the respective plate. The outward projections are integral with the plate of the guide member and of the same resilient material as and is resiliently movable both generally parallel to the plane of the plate of the guide member and also perpendicular to that plate. The guide projections are engaged with vertical and horizontal tension in the guide grooves. The guide member is supported to the housing sidewall on a support surface and is held there by a resilient clip in an opening defined in the sidewall.

17 Claims, 3 Drawing Sheets

ASHTRAY FOR VEHICLES

BACKGROUND OF THE INVENTION

The present invention relates to a container, particularly an ashtray for vehicles, comprising a housing and a drawer like insert which is slidably guided for movement in the housing by guide members which are fastened to the sidewalls of the housing. Each guide member is developed as a resilient materials plate with outwardly directed guide projections arranged on the free longitudinal ends of the plate. The guide projections at the housing cooperate with corresponding guide grooves on the insert.

Containers consisting of a housing and a drawer like insert are known for use in ashtrays for vehicles. For example, German Unexamined Application for Patent OS No. 2,157,661 shows leaf springs between the insert and the housing, and the springs are intended to compensate for play between the insert and the housing. German Utility Models No. 1,812,879, 1,832,239 and 1,977,221 disclose cutting free tongues from the sidewalls of the housing and embossing guide projections in the tongues, which guide projections engage in guide grooves in the insert. Ashtrays having guide grooves in the insert and rollers fastened to the housing and sliding in the guide grooves are disclosed in German Provisional Patent No. AS 1,143,726, and in German Utility Models Nos. 1,814,636, 1,742,307, 1,737,300, 1,696,308. Fastening slide pieces on the housing, which slide in guide grooves in the insert, are disclosed in German Utility Models Nos. 1,794,589, 1,759,721, 1,765,298, and German Provisional Patents Nos. AS 1,113,108 and AS 1,225,433. Finally, providing openings in the insert or the housing for the plug assembly of guide members which cooperate with guide grooves provided on the housing or insert is disclosed in German Unexamined Applications for Patent Nos. OS 2,731,984 and OS 3,409,732.

Containers of the type discussed here generally have difficulty in adapting the dimensions of the housing and the insert to each other such that the insert can slide easily, but nevertheless without play, in the housing and such that there are no chattering noises due to vibrations which occur in a vehicle ashtray upon driving.

Previous solutions described above require improvement. Leaf springs are expensive and afford unsatisfactory quality of guidance. Cutting resilient tongues from the sidewalls of the housing and embossing guide projections in them is also expensive. This makes sense only in the case of sheet metal housings. Further, they are unsatisfactory with regard to the quality of guidance of the insert. Providing rollers between the insert and the housing is particularly expensive, and also affords unsatisfactory guidance. Fastening and provision of slide pieces of the known type is expensive and also affords unsatisfactory guidance. Development and provision of guide members described in German Unexamined Applications for Patent Nos. 2,731,984 and 3,409,732 is less expensive. But, they still require improvement in their quality of guidance.

The known arrangements essentially have in common the feature that the guide elements, namely springs, rollers, and slide pieces, are in each case arranged one behind the other in the direction of pushing of the insert so that the insert has resilient support on in one plane. This, however, does not prevent the insert from shaking during actual use.

SUMMARY OF THE INVENTION

It is therefore the object of the present invention to improve a container, particularly an ashtray for vehicles, of the type described above, with respect to the sliding guidance of the insert and using simple and economical means.

A further object is to provide seating for the insert in the housing which is completely free of shaking even in the open position.

In accordance with the invention, the housing carries guide projections for guiding the insert and the projections are connected integrally to and are of the same material as a respective plate secured on the sidewall of the housing, so that the projections are resiliently movable with respect to each other both in the plane of the plate and perpendicularly thereto. As a result, the guide projections of each plate are arranged one above the other, i.e. transversely to the axis of movement of the insert, and the guide projections engage into the guide grooves of the insert with both vertical and horizontal initial tension. Two plates are preferably fastened spaced apart alongside each other on each sidewall of the housing.

The invention provides economical sliding guidance for the insert and also assures its exact guidance in both the vertical and the horizontal directions. The resilient sliding guidance, with action in two planes horizontal and vertical additionally provides a stable seat, i.e. one which is free of shaking when the insert is in the open position with respect to the housing. As compared with conventional guide elements having merely two support points, each guide element of the invention has twice the number of support points, which is of importance.

In a preferred embodiment of the invention, each plate has a central plate part with a rearwardly projecting resting surface which rests against a side wall of the housing. Two spring arms, which are thinner than the central part of the plate, adjoin and respectively extend away from the two oppositely facing ends of the central part of the plate. Each spring arm includes an endpiece which forms a respective guide projection which is bent off toward the front, directed inwardly from the housing wall, at an approximately right angle to the part of that spring arm projecting from the end of the central plate. In the transition region between the central part of the plate and the spring arms, which terminate on the front side flush with the front side of the central part of the plate, there is a rearwardly directed spring arm bend, which forms a fillet adjacent to the central part and then passes into a section of the spring arm which extends parallel to the plane of the center part of the plate. Each spring arm has at least one front side stiffening rib which extends from the spring arm bends which form a fillet up to just in front of the free end of the spring arm endpiece. The free ends of the spring arm endpieces are rounded and thickened in beadlike manner towards the outside. Plates developed in this manner can be produced simply and economically as plastic injection molded parts. The spring arms are made resilient in particular by the spring arm bends, which form the fillets.

In a further development of the invention, each guide groove provided in the drawer like insert has a substantially flat bottom wall and two sidewalls adjoining the bottom wall at right angles for extending to receive the guide projections, making this insert particularly easy to manufacture.

To make it possible to easily reinsert the insert into the housing after its complete removal from the housing, one sidewall of each guide groove is made longer in the direction of guided movement of the insert than the corresponding opposite sidewall. The same purpose is served by reducing the beadlike thickening of the spring-arm endpieces toward the edges of the spring arms.

Other objects and features of the invention are explained below for one embodiment of the invention with reference to the drawing.

DETAILED DESCRIPTION OF A PREFERRED EMBODIMENT

Figure 1:
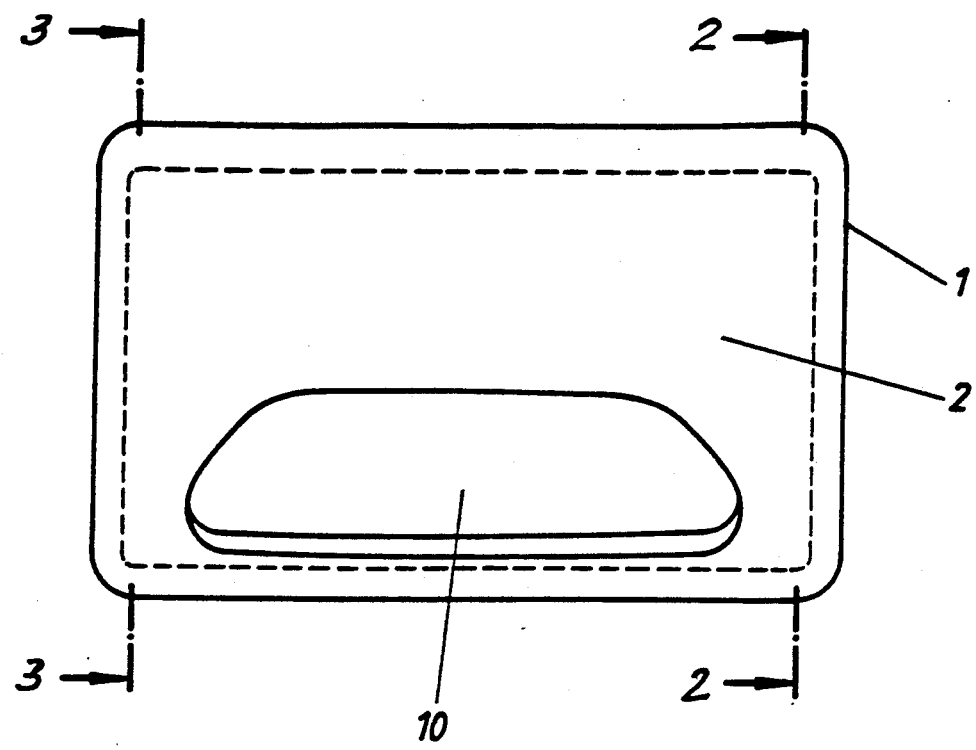
FIG. 1 is a container developed as vehicle ashtray, shown in plan view.
Figure 2:
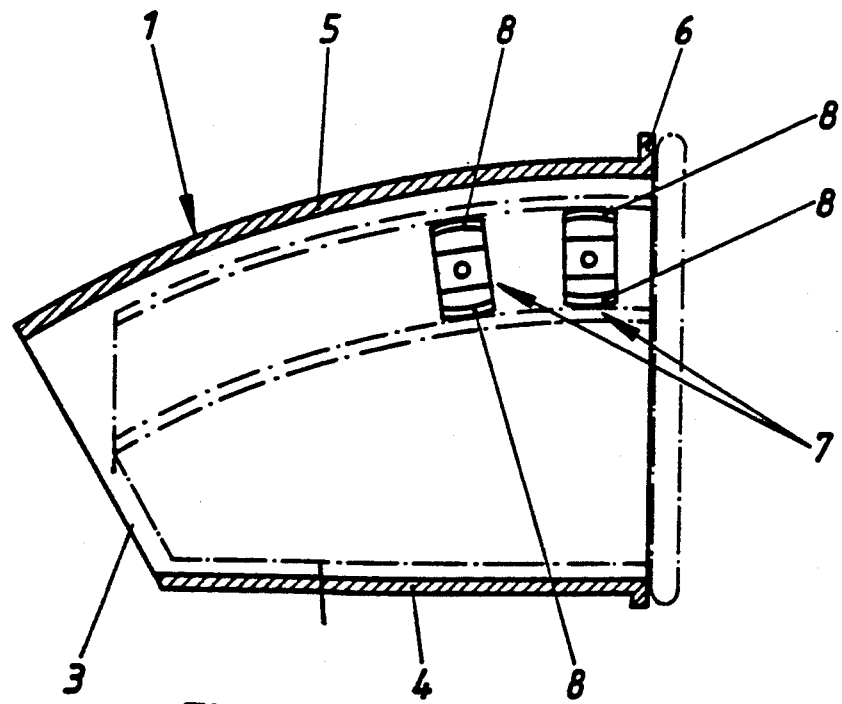
FIG. 2 is a section along the line II—II of FIG. 1.

FIGS. 1 to 4 show a container developed as an ashtray for a motor vehicle. The container comprises a housing 1 and an insert 2 contained in the housing, like a drawer. The housing 1 is open at its front side, is possibly also open at its rear side and has two sidewalls 3, of which only the right hand wall is shown in FIG. 2, a bottom wall 4 and a front wall 5. The housing 1 is preferably a plastic injection molding. The front of the housing includes a circumferential flange 6. On the interior surface of each sidewall 3 of the housing 1, there are fastened, alongside of and spaced apart from each other, two guide members 7. Each member 7 has two spaced apart guide projections 8 which are arranged one above the other, i.e. transverse to the axis of movement of the insert 2.

Figures 3, 4:
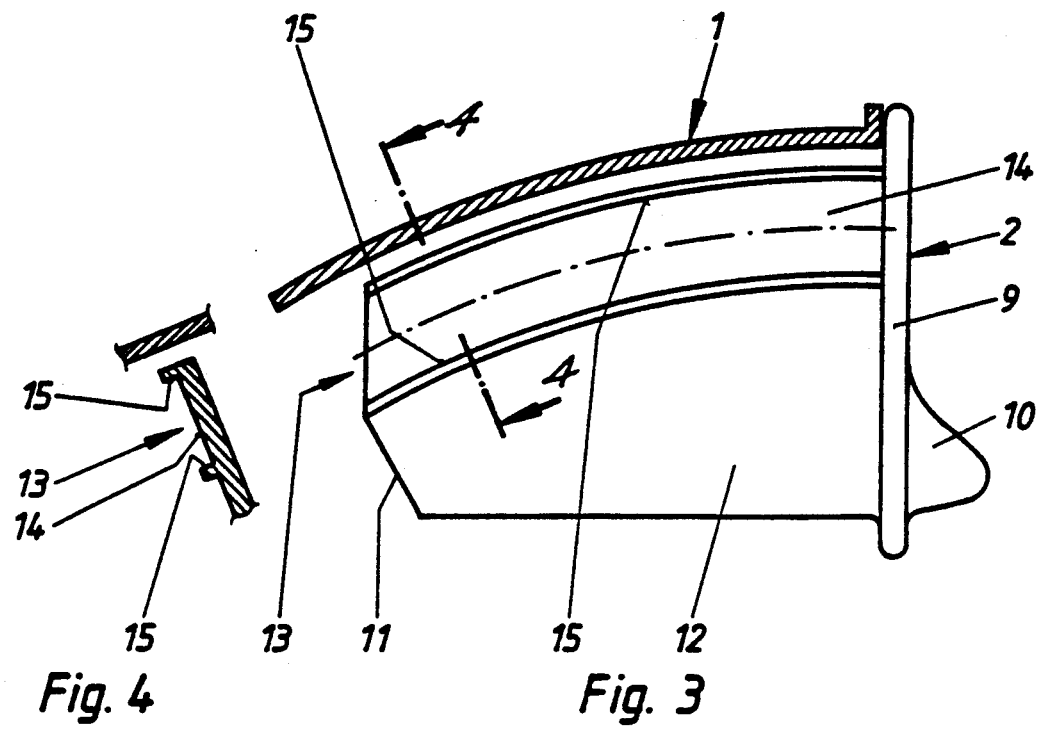
FIG. 3 is a section along the line III—III of FIG. 1.
FIG. 4 is a section along the line IV—IV of FIG. 3.

The insert 2 is shown only in dash-dot line in FIG. 2. It is open only toward the top. It has a front plate 9 on its front side, and that plate may be provided with a handle 10. It has a rear wall 11 on its rear side. It includes two sidewalls 12 at its sides, only one of which is shown in FIG. 3. The insert 2 is preferably developed as a plastic injection molding, like housing 1. On the upper edge region of each sidewall 12, the insert 2 has one guide groove 13 formed along its length, which can extend in a straight line or else in a curve as shown. The guide groove 13 has a substantially flat inner or bottom wall 14 and has two sidewalls 15 adjoining the bottom wall at a right angle. The upper sidewall terminates in front of the rear wall 11 while the lower sidewall terminates at the rear wall 11 so that the upper sidewall is shorter than the lower one.

Figure 5:
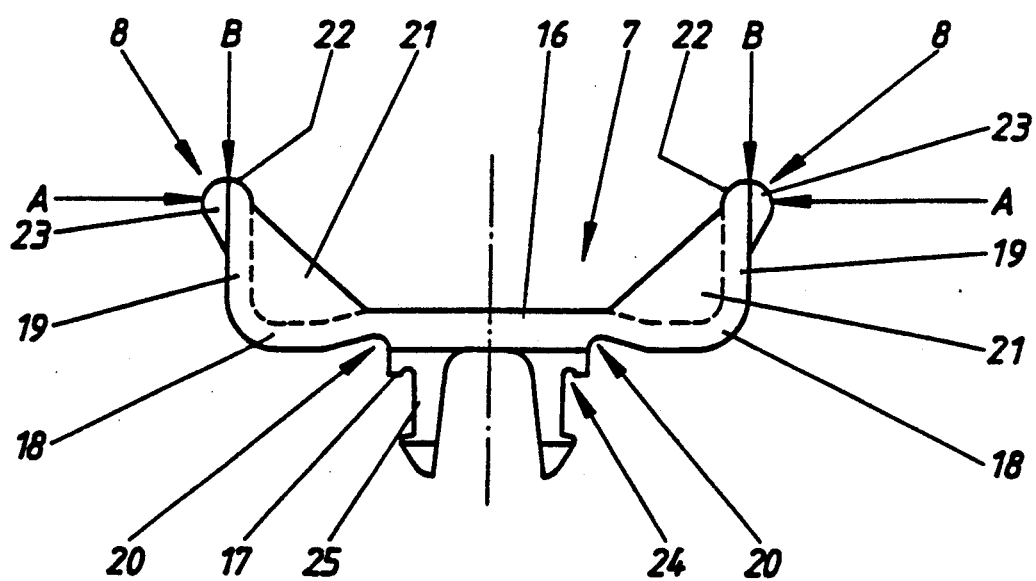
FIG. 5 shows a detail of the invention.
Figure 6:
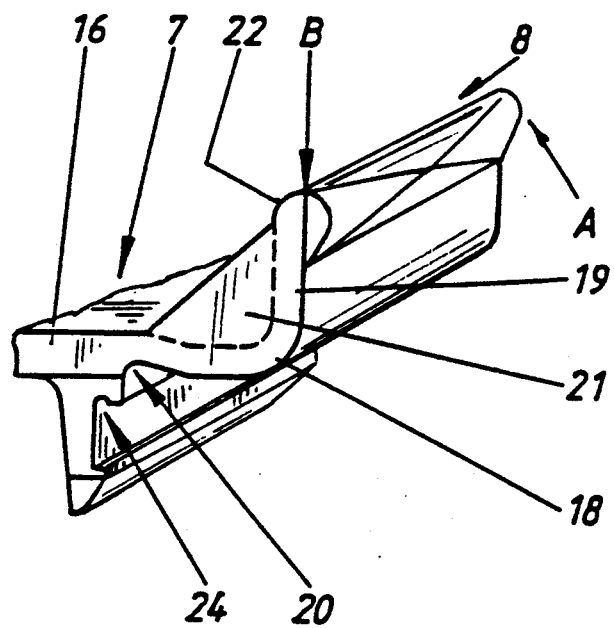
FIG. 6 is an fragmentary perspective end view of FIG. 5.

One of the guide members 7 is shown in greater detail in side view in FIG. 5. Each guide member 7 is developed as an elongate plate with outwardly directed guide projections 8 arranged on its free longitudinal edges or ends. The plate has a central part 16 which includes a resting surface 17 which projects towards the rear of the plate and rests against a respective interior sidewall 3 of the housing 1. Two spring arms 18, which are thinner than the central part 16 of the plate, adjoin and project from two opposite lateral ends or edges of the central part 16 of the plate. Each arm 18 has a spring arm endpiece 19 that is bent off toward the front that is toward the insert (upward in FIG. 5) at approximately a right angle to the arm 18.

There is a transition region between the central part 16 of the plate and the spring arms 18, before the spring arms terminate on the front side flush with the front side of the central part 16 of the plate. At each transition region located at each side of plate 16, there is a rearwardly directed spring arm bend, which forms a fillet 20 and passes into a spring arm section extending parallel to the plane of the central part of the plate. A spring arm endpiece adjoins each spring arm section via a 90° arc. Each spring arm 18 has a front side stiffening rib 21 which extends from the spring arm bend forming a fillet 20 up to just in front of the free end each spring arm endpiece 19. The free end of the spring arm endpiece is rounded at 22 and is thickened toward the outside at bead 23. The beadlike thickening decreases, in a manner not shown in detail, toward the edge of the spring arm 18.

Due to the above-described development of the guide member 7, the guide projections 8 are resilient both parallel to the plane of the central part 16 of the plate, in the direction of the arrow A in FIG. 5, and perpendicular thereto, in the direction of the arrow B. The resiliency is located in the region of the fillets 20. This makes it possible for the guide projections 8 to engage into the guide grooves 13 of the insert 2 with both vertical and horizontal initial tension and to compensate for manufacturing tolerances.

FIG. 5 shows a noncircular, for instance, square, centering projection 24 which adjoins the resting surface 17 of the central part 16 of the plate, and the surface 17 rests against the sidewall 3 of the housing. The centering projection engages into a corresponding noncircular opening (not shown) in the sidewall 3 of the housing. In the embodiment shown, the centering projection 24 is developed as an attachment clip 25. The guide members 7 are preferably developed as integral plastic injection moldings.

It is of course within the scope of the invention to arrange the guide members 7 on the insert 2 and the guide grooves 13 on the housing 1.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:
1. A container, comprising:
a housing having an open side and inwardly facing sidewalls;
a drawer-like insert which is slidably movable along a path of movement into and out of the housing, the insert having outwardly facing sidewalls, each of the sidewalls of the insert having an elongated guide groove formed therein, each of the guide grooves extending along the path of movement; and
guide members for guiding the drawer-like insert along the path of movement, the guide members being fastened to the sidewalls of the housing;
each guide member being formed of a resilient plate and opposite arms, the plate being parallel to a corresponding one of the sidewalls of the housing and having opposite sides which are spaced apart from each other in a direction which is transverse to the path of movement, each of the arms comprising a resilient spring arm portion and a guide projection, each of the spring arm portions adjoining one of the sides of the plate, each of the guide projections projecting inwardly toward the drawer-like insert and being received within a corresponding one of the grooves;

wherein the plate is centrally located between the spring arm portions;

wherein the plate includes an outwardly projecting resting surface which is spaced outwardly from the spring arm portions and which rests against the corresponding sidewall of the housing;

wherein the spring arm portions face laterally away from each other, are thinner than the central plate, are spaced inwardly from the corresponding sidewall of the housing, and are parallel to the outwardly projecting resting surface of the plate;

wherein the guide projections extend inwardly from the spring arm portions, the projections and the spring arm portions forming bends;

wherein the spring arm portions are bent at the sides of the central plate so as to form outwardly directed fillets between the spring arm portions and the sides of the central plate; and wherein the guide projections and the spring arm portions are integrally formed with the central plate, the arms being resiliently connected to the plate, whereby the guide projections are resiliently movable relative to each other in directions generally paralleling the direction of extension of the plate and perpendicular thereto, such that the guide projections engage the corresponding guide groove with initial tension both in the direction of the path of movement of the insert and transverse thereto.

2. The container of claim 1, wherein the guide grooves extend generally horizontally and one of the guide projections is arranged above the other.

3. The container of claim 2, wherein there are a plurality of the guide members at opposite sidewalls of the housing and there is a sidewall at each side of the insert and a respective guide groove in each insert sidewall for receiving the projections of the guide members on the respective sidewalls of the insert.

4. The container of claim 3, wherein there are at least two of the guide members fastened alongside of each other at each of the sidewalls of the housing and the guide members at each sidewall are spaced from each other along the path of movement of the insert.

5. The container of claim 2, wherein each of the guide grooves the insert comprises a substantially flat bottom wall and a pair of spaced apart sidewalls projecting out of the bottom wall for receiving between them the projections.

6. The container of claim 5, wherein the two sidewalls of the guide groove adjoin the bottom wall at a right angle and the bottom wall is substantially flat.

7. The container of claim 5, wherein one sidewall defining a guide groove is of greater length in the path of extension of the guide groove than the other sidewall.

8. The container of claim 1, further comprising a front side stiffening rib at a forward side of each of the arms, and the stiffening rib extending from the region of the spring arm portion bent to form a fillet up to approximately a free end of the guide projection.

9. The container of claim 8, wherein the free end is rounded in shape and is thickened generally away from the other projection and generally defines a bead.

10. The container of claim 9, wherein the beadlike thickening of the free ends decreases toward the edges of the arms.

11. The container of claim 1, wherein the guide projection is bent off inwardly from the spring arm portion at an approximately right angle.

12. The container of claim 1, further comprising a centering projection on the plate generally adjacent the resting surface extending toward the housing sidewall, and a respective opening defined in the sidewall for receiving the centering projection.

13. The container of claim 12, wherein the centering projection is non-circular in shape and the opening in the sidewall for receiving the centering projection is correspondingly non-circularly shaped.

14. The container of claim 13, wherein the centering projection is generally square in shape.

15. The container of claim 12, wherein the resting surface is located outward of and on opposite sides of the centering projection.

16. The container of claim 12, wherein the centering projection is in the form of a spreadable clip for resilient attachment of the clip into the opening in the housing sidewall.

17. The container of claim 1, wherein the guide members are plastic injection moldings.

* * * * *